US006687584B2

(12) United States Patent

Andreasen et al.

(10) Patent No.: US 6,687,584 B2

(45) Date of Patent: Feb. 3, 2004

(54) AUTOMOTIVE CODE READER

(75) Inventors: Keith Andreasen, Huntington Beach, CA (US); Ieon C. Chen, Laguna Hills, CA (US)

(73) Assignee: Innova Electronics Corporation, Fountain Valley, CA (US)

( * ) Notice: Subject to any disclaimer, the term of this patent is extended or adjusted under 35 U.S.C. 154(b) by 0 days.

(21) Appl. No.: 10/036,601

(22) Filed: Dec. 31, 2001

(65) Prior Publication Data

US 2003/0125851 A1 Jul. 3, 2003

(51) Int. Cl.[7] .................................................. G06F 19/00

(52) U.S. Cl. ............................ 701/29; 701/32; 340/438

(58) Field of Search ............................. 701/29, 30, 31, 701/32, 33, 34, 35; 340/438, 439

(56) References Cited

U.S. PATENT DOCUMENTS

| | | | | | |
|---|---|---|---|---|---|
| 2,960,654 | A | | 11/1960 | Nelson | |
| 3,646,438 | A | | 2/1972 | Staff | |
| 4,176,315 | A | | 11/1979 | Sunnarborg | |
| 4,207,611 | A | | 6/1980 | Gordon | |
| 4,404,639 | A | | 9/1983 | McGuire et al. | |
| 4,859,932 | A | | 8/1989 | Whitley | |
| 4,884,033 | A | | 11/1989 | McConchie, Sr. | |
| 5,003,478 | A | * | 3/1991 | Kobayashi et al. | 701/32 |
| 5,005,129 | A | * | 4/1991 | Abe et al. | 701/31 |
| 5,107,428 | A | * | 4/1992 | Bethencourt et al. | 701/35 |
| 5,157,708 | A | | 10/1992 | Garthwaite et al. | |
| 5,214,582 | A | * | 5/1993 | Gray | 701/33 |
| 5,247,245 | A | | 9/1993 | Nelson | |
| 5,278,508 | A | | 1/1994 | Bowman | |
| 5,285,163 | A | | 2/1994 | Liotta | |
| 5,359,290 | A | | 10/1994 | Cervas | |
| 5,394,093 | A | | 2/1995 | Cervas | |
| 5,400,018 | A | | 3/1995 | Scholl et al. | |
| 5,481,906 | A | | 1/1996 | Nagayoshi et al. | |
| 5,491,418 | A | | 2/1996 | Alfaro et al. | |
| 5,506,772 | A | | 4/1996 | Kubozono et al. | |
| 5,541,840 | A | * | 7/1996 | Gurne et al. | 701/33 |
| 5,657,233 | A | | 8/1997 | Cherrington et al. | |
| 5,758,300 | A | | 5/1998 | Abe | |
| 5,916,286 | A | | 6/1999 | Seashore et al. | |
| 6,225,898 | B1 | | 5/2001 | Kamiya et al. | |
| 6,263,265 | B1 | | 7/2001 | Fera | |
| 6,295,492 | B1 | | 9/2001 | Lang et al. | |
| 6,330,499 | B1 | | 12/2001 | Chou et al. | |
| 6,535,802 | B1 | * | 3/2003 | Kramer | 701/29 |
| 2002/0193925 | A1 | * | 12/2002 | Funkhouser et al. | 701/33 |
| 2003/0060953 | A1 | * | 3/2003 | Chen | 701/33 |

OTHER PUBLICATIONS

Sensor Testers Product Comparison (4 Pages), 1995.

Sunpro Sensor Tester Plus (1 Page), undated.

OTC's Latest Innovations, 1989 (6 Pages).

OTC Diagnostic Testers and Tools for the Professional, (20 Pages), undated.

OTC System 2000 Diagnostic Testers and Tool (24 Pages), undated.

EPA Performing Onboard Diagnostic System Checks as Part of a Vehicle Inspection and Maintenance Program, Jun. 2001, (25 Pages).

* cited by examiner

*Primary Examiner*—Gary Chin

(74) *Attorney, Agent, or Firm*—Stetina Brunda Garred & Brucker

(57) ABSTRACT

A method of displaying automotive diagnostic information is disclosed comprising connecting a code reader to a vehicle computer and communicating monitor status information and trouble codes to the code reader. Only those monitor functions that are supported by the vehicle are illuminated on the code reader, along with their status. Trouble codes communicated from the vehicle are also displayed, along with trouble code descriptors. All display functions are operative independent of any manual input to identify the type of vehicle being tested.

11 Claims, 3 Drawing Sheets

AUTOMOTIVE CODE READER

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to methods and systems for diagnosing a vehicle, and more particularly to displaying diagnostic fault codes generated by automobile computer systems.

Modern motor vehicles include a computer control system. The main purpose of the vehicle computer control system is to provide maximum engine performance with the least amount of air pollution and the best fuel efficiency possible. The computer control system consists of the on-board computer and related electronic control devices (sensors, switches, and actuators). The control devices may control various systems and/or subsystems within the vehicle. These electronic control devices send information to the on-board computer about such parameters as the temperature and density of the outside air, the speed of the engine, the amount of the fuel delivered, etc. At the same time, the on-board computer scans for any problems from its sensors. If a problem is detected, the on-board computer restores the problem as a numeric code, referred to as a diagnostic trouble code or fault code, in its memory for later retrieval. In this regard, the diagnostic trouble codes (DTCs) are codes that identify a particular problem area and are intended as a guide to the proper collective servicing of the vehicle.

In response to governmental regulations and industry practices, vehicle manufacturers have begun to standardize diagnostic trouble codes. For example, the current generation standard for communications protocol is referred to as OBD II. Beginning in 1996, all vehicles built for sale in the United States were required to be OBD II—compliant.

Hand-held or portable code readers, also referred to as diagnostic code readers or scan tools, have been utilized to trouble shoot false or problems or associated with these electronic control units. Such code readers are configured to electronically communicate with a vehicle's on-board computer for accessing stored diagnostic trouble codes. The more sophisticated code readers may be configured to determine a particular standard for communications protocol being implemented by the subject vehicle. The code reader interfaces with the vehicle's on-board computer via a connection point which is usually located under the instrument panel (dash), on the driver's side of most vehicles. OBD II—compliant vehicles are configured to have an on-board computer equipped to receive a 16 pin data link connector cable from the code reader.

The code reader typically has a display for indicating received diagnostic trouble codes. Some code readers include problem description data correlated to the diagnostic trouble codes stored in memory. Other code readers are used in connection with a booklet containing problem description data correlated to the diagnostic trouble codes.

From the perspective of vehicle owners, personal use of code readers may be advantageous. Vehicle owners may choose to effect the repair themselves, possibly at a substantial cost savings in comparison to having service providers or technicians perform the same repairs. Alternatively, even if the services of a service technician are utilized, with the advanced knowledge as to the nature and scope of the vehicle problem, a vehicle owner may be able to mitigate unwarranted services and costs. Moreover, a vehicle owner may avoid a service fee to the service technician for performing the very same task of retrieving the diagnostic trouble codes and correlating them to the problem description data.

Notwithstanding the above advantages of code readers, contemporary code readers have not typically optimized simplicity of design and display to enhance ease of use. In particular, contemporary code readers typically require a manual setup, in advance of operation. The manual setup requires a user to scroll through a variety of information, e.g., make and model information, to set the code reader to receive and process codes appropriately.

Additionally, contemporary code readers typically display informational categories that may not apply to the particular vehicle under test. As such, the display becomes unduly complex and confusing to many users.

Accordingly, there is a need to provide an automotive code reader that requires no manually driven setup, displays only informational categories relevant to the vehicle being tested, and arrays the displayed information in a single display.

These and other objects and advantages are achieved by means of the present invention, as described in more detail below.

BRIEF SUMMARY OF THE INVENTION

A method of displaying automotive diagnostic information is disclosed comprising connecting a code reader to a vehicle computer and communicating monitor status information and trouble codes to the code reader. Only those monitor functions that are supported by the vehicle are illuminated on the code reader, along with their status. Trouble codes communicated from the vehicle are also displayed, along with trouble code descriptors. All display functions are operative independent of any manual input to identify the type of vehicle being tested.

Trouble code descriptors and selective illumination of supported monitor functions is implemented independent of any user input identifying the type of vehicle being tested.

All supported monitors are displayed in a single display.

In one embodiment all diagnostic display functions are displayed in a single display.

BRIEF DESCRIPTION OF THE DRAWINGS

The features of the present invention will become more apparent upon reference to the drawings wherein.

DETAILED DESCRIPTION OF THE INVENTION

Figure 1:
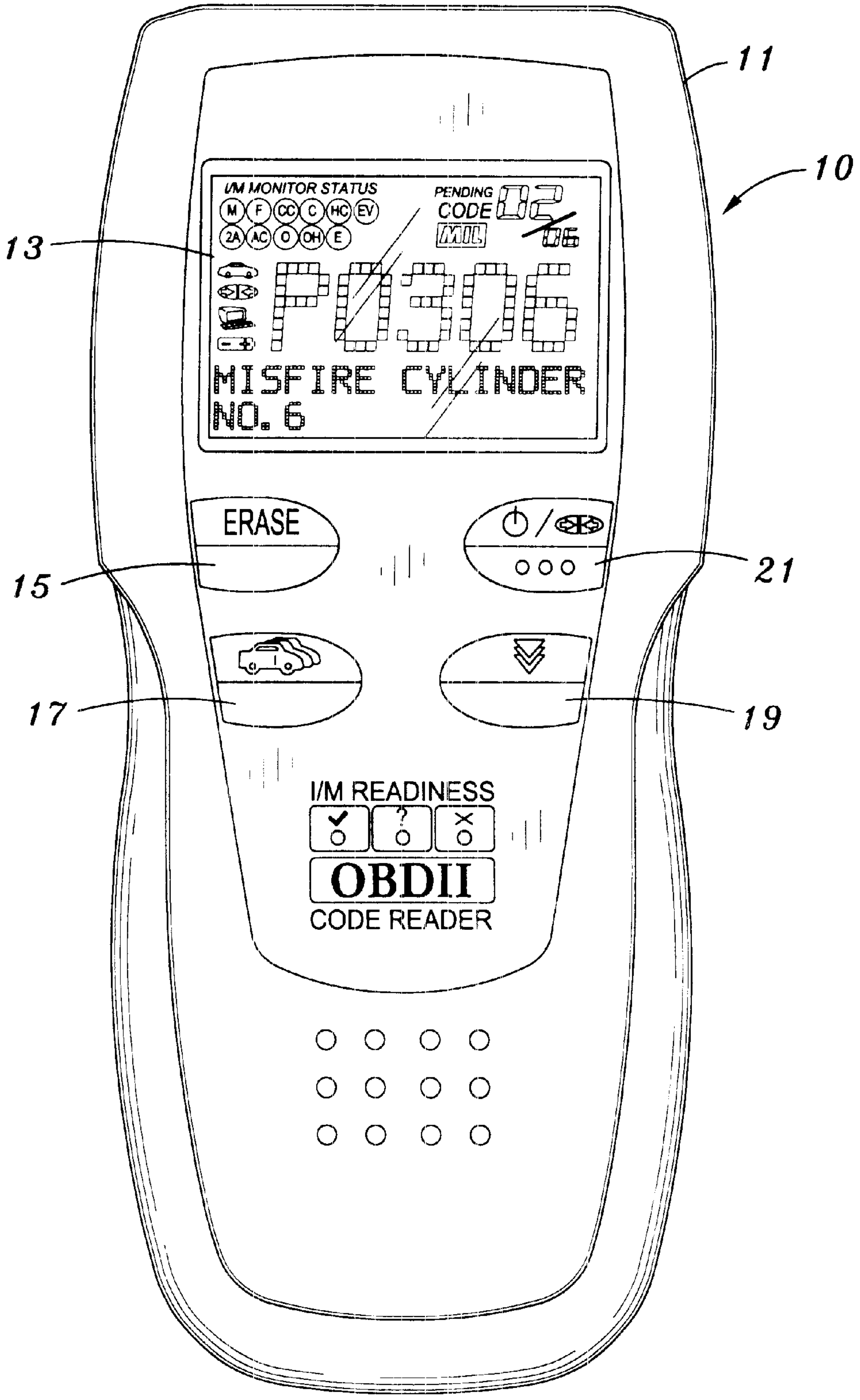
FIG. 1 is a front view of a code reader formed in accordance with the present invention.

FIG. 1 illustrates a code reader 10 that operates in accordance with the present invention. The code reader 10 includes a housing 11 which incorporates active components, including electrical circuitry to implement the functions described below. The display 13 is disposed on the housing 11 and is operative to display test results, code reader functions and monitor status information as described more fully below.

Erase button 15 functions to erase diagnostic trouble codes (DTCs) and freeze frame data and resets monitor status. Scroll button 17 functions to scroll the display 13 to view diagnostic trouble codes when more than one DTC is present.

Link button 19 functions to link the code reader with the vehicle's powertrain control module (PCM) to retrieve any DTCs that are present in memory and to view readiness monitor status. Power button 21 operates to turn the code reader on and off.

Figure 2:
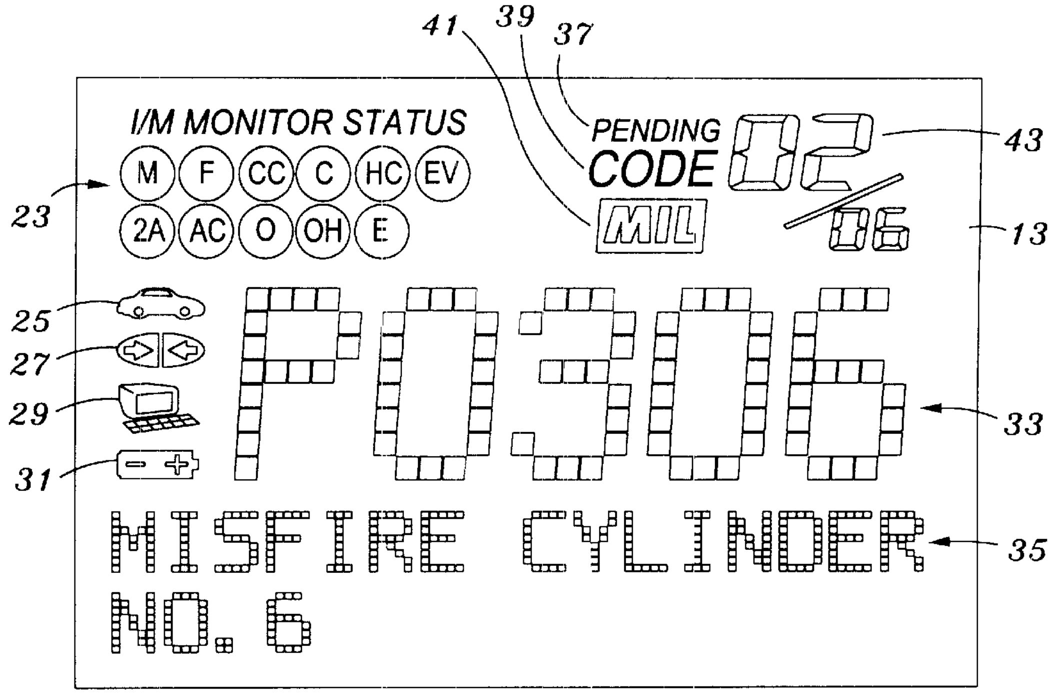
FIG. 2 is an enlarged view of a display on the code reader shown in FIG. 1.

Referring to FIG. 2, the display 13 is shown in more detail. The display includes various icons as described below. The icons are arranged and ordered in such a way to optimize display of information in a single review, while deleting icons that are unrelated to the particular type of vehicle in interest.

I/M monitor status display illustrates various monitors that correlate to monitors in the vehicle being tested. The monitors include a variety of functions, not all of which may be supported by a particular vehicle. In accordance with the present invention, only those monitored functions that are supported by the present vehicle are lit. Where a monitor is supported, but not operative to provide test data, an indication of such may be provided, e.g., by blinking the appropriate indicator. Where a monitor is supported, but determined to be inoperative in relation to prescribed parameters, an indication is also provided, e.g., by altering the substance or color of the appropriate display.

The vehicle icon 25 indicates whether or not the code reader is being properly powered to the vehicle's data link connector. The link icon 27 indicates whether or not the code reader is communicating (linked) with the vehicle's on-board computer. The computer icon 29 provides an indication as to whether or not the monitor is optionally connected to a computer link. The battery icon 31 indicates the status of the code reader internal battery.

The display 33 displays the DTC number for any diagnostic trouble code identified by the code reader. Each particular fault is assigned a code number that is specific to that fault.

The translator display 35 displays the fault code that corresponds to the DTC illustrated at display 33. As such, the translator display avoids the need for a user to separately refer to a list of trouble codes that may correspond to a particular DTC. As such, the code reader allows for more complete information within a single display, for the convenience of the user. The translator display is implemented by means of a look-up table within the code reader that operates to produce the trouble code descriptor (translation).

The pending display 37 indicates if the display DTC is a pending code. A code icon 39 identifies the code number sequence display area. The MIL icon 41 indicates the status of the malfunction indicator lamp (MIL). The MIL icon is visible only when a DTC has commanded the MIL to illuminate on the vehicle's dash.

The code reader assigns a sequence number to each DTC that is present in the PCMs memory, in ascending order, starting with 01. The code number sequence 43 indicates which DTC is being displayed, and how many such codes are in memory, e.g., displaying code number 2 of 6 stored codes.

Figure 3:
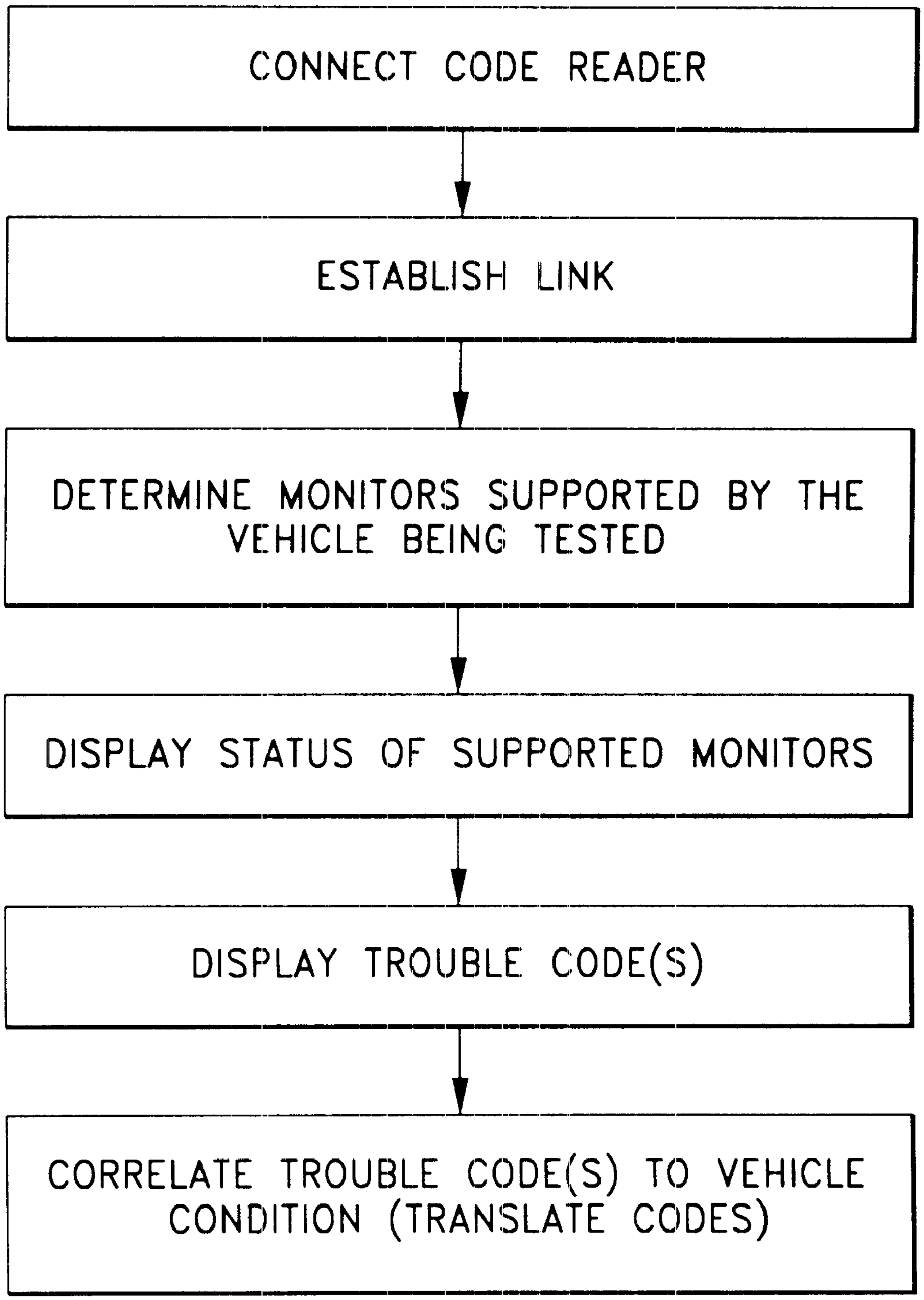
FIG. 3 is a block diagram illustrating the sequence of steps performed by the code reader in operation.

FIG. 3 implements a sequence of steps that are implemented by the present invention. The steps collectively allow the display of information, as illustrated in more detail at FIG. 2. Moreover, the steps are representative of the functions operative to identify the type of vehicle being tested, the monitors supported by that type of vehicle, and the vehicle conditions correlating to trouble codes from the same type of vehicle. As such, information is collected, condensed, sorted and displayed in a simple format that belies the sophistication of analysis.

As illustrated in FIG. 3 the code reader is connected to the vehicle test connector and a link is established between the code reader and the vehicle computer.

Different types of vehicles generate different types of signals. By analysis of the signals received by the code reader, e.g., the monitor signals being generated, the vehicle type can be determined. Where only certain monitors are supported, the display is operative to illuminate only the supported monitors, and not others. As such, the display of monitor functions is limited to those functions supported by the particular vehicle being tested.

Trouble codes communicated from the vehicle computer are also displayed in the code reader. The code reader further operates to correlate the trouble codes to a vehicle condition description, which is also displayed in the code reader.

As such, information is collected, processed and displayed in a form that minimizes the need for any supplemental source to identify the vehicle in question and the monitors supported by that vehicle. Additionally, the invention avoids the need for additional references to correlate the display trouble codes to particular vehicle conditions. Accordingly, the invention provides significant ease of use and convenience useful to practical operation.

As will be recognized by one of ordinary skill in the art, various changes and modifications may be made to the invention without departing from the broader scope of the invention, as described herein.

What is claimed is:

1. A method of displaying automotive diagnostic information comprising:

connecting a code reader to a vehicle computer;

communicating monitor status information and trouble codes to the code reader from the vehicle computer;

selectively illuminating monitor icons on the code reader that are supported by the vehicle being tested;

displaying status of the supported monitors;

displaying said trouble codes communicated from the vehicle computer; and displaying trouble code descriptors corresponding to the displayed trouble codes.

2. The process as recited in claim 1 wherein the trouble code descriptors are generated independent of any user input upon receipt of the trouble codes.

3. The method as recited in claim 2 wherein the trouble code descriptors are generated independent of any user input to identify the type of vehicle being tested.

4. The method as recited in claim 1 wherein the selective illumination of supported monitors is implemented independent of any user input identifying the type of vehicle being tested.

5. The method as recited in claim 1 wherein the status of all the supported monitors is displayed in a single display.

6. The method as recited in claim 1 wherein the supported monitor icons, the monitor status, at least one trouble code and at least one trouble code descriptor are displayed in a single display.

7. The method as recited in claim 1 wherein the supported monitor icons, the monitor status, at least one trouble code and at least one trouble code descriptor are displayed independent of any manual input to identify the type of vehicle being tested.

8. The method as recited in claim 1 wherein the selected monitor icons, monitor status display, trouble code display, and trouble code descriptor are displayed concurrently.

9. The method as recited in claim 8 wherein the supported monitor icons, the monitor status, at least one trouble code and at least one trouble code descriptor are displayed on a single display independent of any user input identfying the vehicle being tested.

10. The method as recited in claim 9 wherein the supported monitor icons, the monitor status, the at least one trouble code, and the at least one trouble code discriptor are displayed on a single display, in response to a single user input signal.

11. The method as recited in claim 1 wherein the selected monitor icons, monitor status, at least one trouble code and at least one trouble code descriptor are accessed and displayed independent of any navigation of a user interface menu.

* * * * *